United States Patent
Axnäs et al.

(10) Patent No.: US 11,044,133 B2
(45) Date of Patent: Jun. 22, 2021

(54) COMBINING SYNCHRONIZATION SEQUENCES OF DIFFERENT LENGTHS

(71) Applicant: Telefonaktiebolaget LM Ericsson (publ), Stockholm (SE)

(72) Inventors: Johan Axnäs, Solna (SE); Robert Baldemair, Solna (SE); Naga Vishnu Kanth Irukulapati, Gothenburg (SE); Andres Reial, Malmö (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 87 days.

(21) Appl. No.: 16/483,582

(22) PCT Filed: Dec. 22, 2017

(86) PCT No.: PCT/IB2017/058372
§ 371 (c)(1),
(2) Date: Aug. 5, 2019

(87) PCT Pub. No.: WO2018/142206
PCT Pub. Date: Aug. 9, 2018

(65) Prior Publication Data
US 2020/0099564 A1  Mar. 26, 2020

Related U.S. Application Data

(60) Provisional application No. 62/455,305, filed on Feb. 6, 2017.

(51) Int. Cl.
*H04L 27/26* (2006.01)
*H04L 5/00* (2006.01)
(Continued)

(52) U.S. Cl.
CPC ...... *H04L 27/2655* (2013.01); *H04J 13/0062* (2013.01); *H04L 5/0007* (2013.01);
(Continued)

(58) Field of Classification Search
None
See application file for complete search history.

(56) References Cited

U.S. PATENT DOCUMENTS 6,594,680 B1 * 7/2003 Gu .................... G06F 7/584
708/252
2008/0267137 A1 10/2008 Dabak et al.
(Continued)

FOREIGN PATENT DOCUMENTS

CN  101166169 A  4/2008
CN  105635002 A  6/2016
(Continued)

OTHER PUBLICATIONS

Huawei et al., "RACH preamble design for NR", 3GPP TSG RAN WG1 NR Ad Hoc Meeting (R1-1700034), vol. RAN WG1, No. Spokane, USA; Jan. 16, 2017-Jan. 20, 2017 Jan. 16, 2017 (Jan. 16, 2017), XP051207576, Retrieved from the Internet: URL:http://www.3gpp.org/ftp/Meetings_3GPP SYNC/RAN1/Docs/ [retrieved on Jan. 16, 2017], 12 pages.
(Continued)

*Primary Examiner* — Scott M Sciacca

(57) ABSTRACT

A system and method for generating a composite synchronization sequence in a communication system. In one embodiment, the apparatus is configured to provide a first synchronization sequence and a second synchronization sequence in a first domain, transform the first synchronization sequence and the second synchronization sequence into a second domain, and extend the first synchronization sequence and the second synchronization sequence in the
(Continued)

second domain to a common length to produce an extended first synchronization sequence and an extended second synchronization sequence. The apparatus is also configured to transform the extended first synchronization sequence and the extended second synchronization sequence into the first domain, and multiply elementwise the extended first synchronization sequence by the extended second synchronization sequence in the first domain to obtain a composite synchronization sequence.

20 Claims, 7 Drawing Sheets

(51) Int. Cl.
    *H04J 13/00* (2011.01)
    *H04W 74/06* (2009.01)
(52) U.S. Cl.
    CPC .......... *H04L 5/0048* (2013.01); *H04L 5/0053* (2013.01); *H04L 27/2607* (2013.01); *H04L 27/2613* (2013.01); *H04L 27/2628* (2013.01)

(56) References Cited

U.S. PATENT DOCUMENTS

| 2009/0325513 | A1* | 12/2009 | Iwai ...................... H04L 5/0016 455/91 |
| 2019/0132084 | A1* | 5/2019 | Zhang ............... H04W 72/0446 |
| 2019/0222456 | A1* | 7/2019 | Zeng .................. H04L 27/2614 |

FOREIGN PATENT DOCUMENTS

| CN | 106105361 A | 11/2016 |
| GB | 2490362 A | 10/2012 |
| WO | 0120797 A1 | 3/2001 |
| WO | 2007073079 A1 | 6/2007 |
| WO | 2012084001 A1 | 6/2012 |
| WO | 2016186696 A1 | 11/2016 |
| WO | 2017078827 A1 | 5/2017 |
| WO | 2018142206 A1 | 8/2018 |

OTHER PUBLICATIONS

LG Electronics, "Several Types of Uplink Reference Signal Sequence", 3GPP TSG RAN WG1 #47bis (R1-070234), (Jan. 10, 2007), XP050104273, [retrieved on Jan. 10, 2007], 4 pages.

Osamu Takyu et al: "Scattered pilot assisted channel estimation for IFDMA", Wireless Communication, Vehicular Technology, Information Theory and Aerospace&Electronic Systems Technology, 2009. Wireless Vitae 2009. 1 st International Conference on, IEEE, Piscataway, NJ, USA, May 17, 2009 (May 17, 2009), pp. 832-836, XP031495959, ISBN: 978-1-42444066-5.

Huawei et al: "PRACH preamble sequences and formats for capacity enhancement and beam management", 3GPP Draft; R1-1709917, 3rd Generation Partnership Project (3GPP), vol. RAN WG1, No. Qingdao, China; Jun. 27, 2017-Jun. 30, 2017 Jun. 26, 2017 (Jun. 26, 2017), XP051299142, Retrieved from the Internet: URL:http://www.3gpp.org/ftp/Meetings_3GPP SYNC/RAN1/Docs [retrieved on Jun. 26, 2017], 8 pages.

Hamad-Ameen, Jalal Jamal: "Proposed sets of Polyphase Spreading Sequences for DS-CDMA System", Proceedings of the 5th WSEAS International Conference on Telecommunications and Informatics, Istanbul, Turkey, May 27-29, 2006 (pp. 371-376).

PCT/SE2017/058372 Written Opinion of the International Searching Authority and International Search Report dated Mar. 20, 2018, 14 pages.

CN Office Action for Application No. 201780085821.1, Applicant Telefonaktiebolaget LM Ericsson (publ), dated Oct. 10, 2020, English Summary of Office Action 4 pgs, Chinese Office Action 7 pages.

* cited by examiner

COMBINING SYNCHRONIZATION SEQUENCES OF DIFFERENT LENGTHS

CROSS-REFERENCE TO RELATED APPLICATION

This application is the National Stage of, and therefore claims the benefit of, International Application No. PCT/IB2017/058372 filed on Dec. 22, 2017, entitled "COMBINING SYNCHRONIZATION SEQUENCES OF DIFFERENT LENGTHS" which claims the benefit of U.S. Provisional Application No. 62/455,305 filed on Feb. 6, 2017 entitled "COMBINING SYNCHRONIZATION SEQUENCES OF DIFFERENT LENGTHS". The above-referenced applications are commonly assigned with this National Stage application and is incorporated herein by reference in its entirety.

TECHNICAL FIELD

The present invention is directed, in general, to the communication systems and, more specifically, to a system and method for generating a composite synchronization sequence in a communication system.

BACKGROUND

In a typical radio communication system (e.g., Long Term Evolution ("LTE")), the initial transmission from a user equipment ("UE") after power-on typically includes a preamble on a physical random access channel ("PRACH"). The PRACH preamble is a synchronization sequence serving the purposes of informing the network about the presence of a user equipment to join the network, and allowing the network to estimate the round-trip delay between the user equipment and a network transmission and reception point ("TRP"). The estimate of the round-trip delay between the user equipment and the transmission and reception point is possible since the user equipment makes its PRACH transmission at a certain predefined time interval after hearing a synchronization channel transmission transmitted by the transmission and reception point on the downlink. The estimated round-trip delay is then used to configure the user equipment with a timing advance, i.e., the user equipment should in any subsequent transmission compensate for the round-trip delay by transmitting early, thereby ensuring that transmissions reach the transmission and reception point at the desired point in time.

The round-trip delay can be rather large, several times larger than the cyclic prefix ("CP") of an orthogonal frequency division multiplex ("OFDM") symbol, or even much larger than an entire OFDM symbol. Therefore, for accurate detection with large delay uncertainty, the communication system uses a special, very long OFDM symbol for the PRACH, which is based on a discrete Fourier transform ("DFT") that is 12 times the size of the normal discrete Fourier transform, and also has a long cyclic prefix. This solution may work well in the LTE, but in Fifth Generation ("5G") radio communication systems, where large antenna arrays will be a cornerstone, the potential need for a special large discrete Fourier transform in an application specific integrated circuit ("ASIC") for every antenna branch can be undesirable from an implementation point of view. There are also other potential issues, for instance, related to co-existence of different signal numerologies.

Accordingly, what is needed in the art is a system and method for generating a composite synchronization sequence for communication between communication nodes in a communication system.

SUMMARY

These and other problems are generally solved or circumvented, and technical advantages are generally achieved, by advantageous embodiments of the present invention for a system and method for generating a composite synchronization sequence in a communication system. In one embodiment, the apparatus is configured to provide a first synchronization sequence in a first domain, provide a second synchronization sequence in the first domain having a different length than the first synchronization sequence, and transform the first synchronization sequence and the second synchronization sequence into a second domain. The apparatus is also configured to extend the first synchronization sequence in the second domain and the second synchronization sequence in the second domain to a common length to produce an extended first synchronization sequence and an extended second synchronization sequence, and transform the extended first synchronization sequence and the extended second synchronization sequence into the first domain. The apparatus is still further configured to multiply elementwise the extended first synchronization sequence in the first domain by the extended second synchronization sequence in the first domain to obtain a composite synchronization sequence.

In another embodiment, the apparatus is configured to provide a first synchronization sequence in a first domain, provide a second synchronization sequence in the first domain having a different length than the first synchronization sequence, and transform the first synchronization sequence into a second domain. The apparatus is also configured to extend the first synchronization sequence in the second domain to a common length with the second synchronization sequence in the first domain to produce an extended first synchronization sequence, and transform the extended first synchronization sequence into the first domain. The apparatus is still further configured to multiply elementwise the extended first synchronization sequence in the first domain by the second synchronization sequence in the first domain to obtain a composite synchronization sequence.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for generating a composite synchronization sequence in a communication system. While the principles will be described in the environment of a Third Generation Partnership Program ("3GPP") Long Term Evolution ("LTE") communication system, any environment such as a Wi-Fi wireless communication system is well within the broad scope of the present disclosure.

Figure 1:
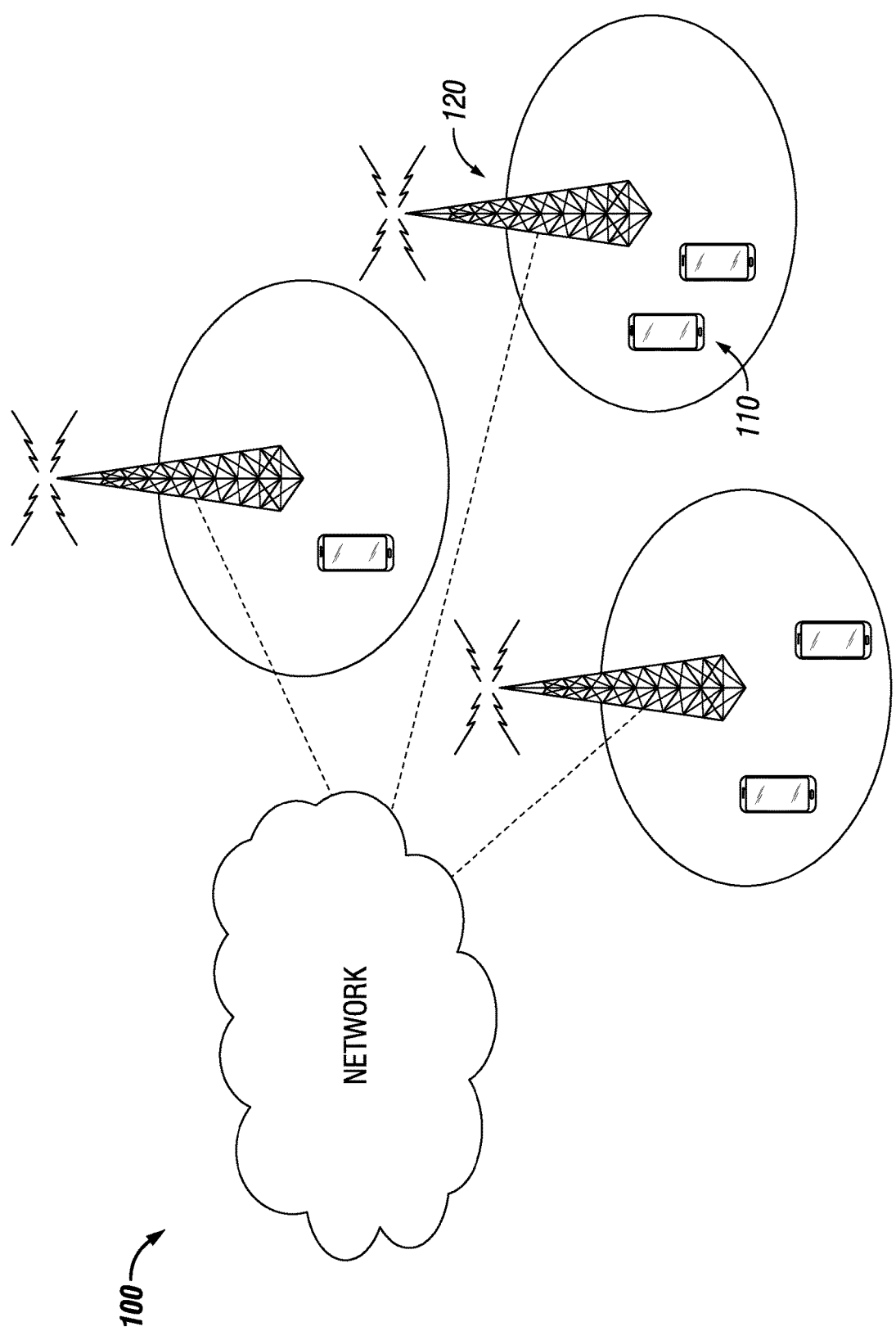
FIGS. 1 to 3 illustrate diagrams of embodiments of a communication system, and portions thereof.
Figure 3:
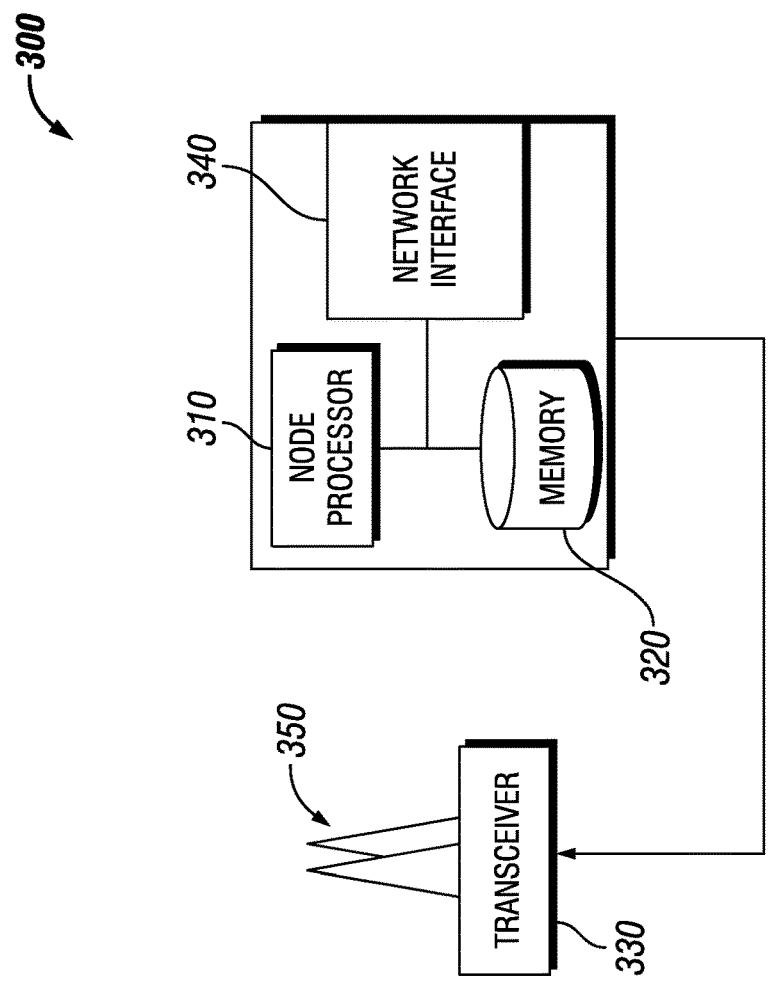
Figure 2:
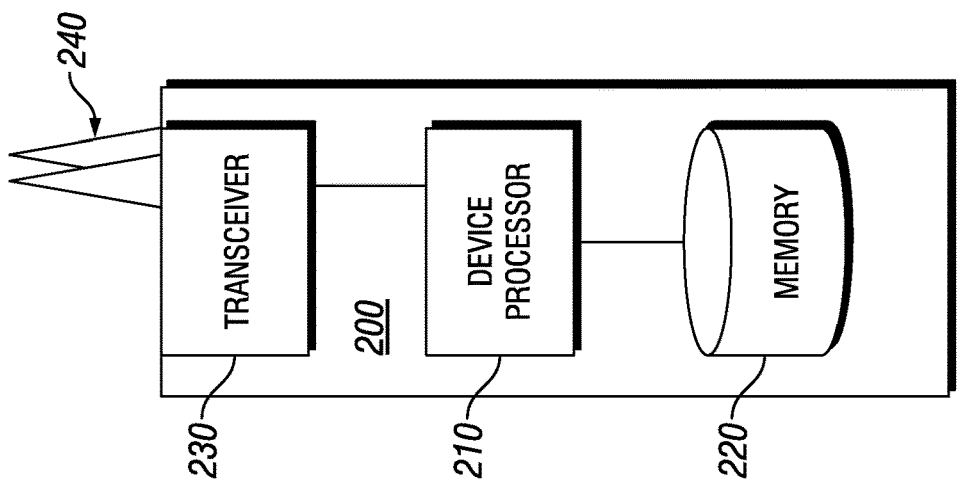

Referring initially to FIGS. 1 to 3, illustrated are diagrams of embodiments of a communication system 100, and portions thereof. As shown in FIG. 1, the communication system 100 includes one or more instances of wireless communication devices (one of which is designated 110, and also referred to as user equipment ("UE")).

The wireless communication device 110 may be any device that has an addressable interface (e.g., an Internet protocol ("IP") address, a Bluetooth identifier ("ID"), a near-field communication ("NFC") ID, etc.), a cell radio network temporary identifier ("C-RNTI"), and/or is intended for accessing services via an access network and configured to communicate over the access network via the addressable interface. For instance, the wireless communication device 110 may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The wireless communication device 110 may be a portable, pocket-storable, hand-held, computer-comprised, or vehicle-mounted mobile device, enabled to communicate voice and/or data, via a wireless or wireline connection. A wireless communication device 110 may have functionality for performing monitoring, controlling, measuring, recording, etc., that can be embedded in and/or controlled/monitored by a central processing unit ("CPU"), microprocessor, ASIC, or the like, and configured for connection to a network such as a local ad-hoc network or the Internet. A wireless communication device 110 may have a passive communication interface, such as a quick response (Q) code, a radio-frequency identification ("RFID") tag, an NFC tag, or the like, or an active communication interface, such as a modem, a transceiver, a transmitter-receiver, or the like.

The communication system 100 also includes one or more radio access nodes (one of which is designated 120) such as eNodeBs, gNBs or other base stations capable of communicating with the wireless communication devices 110 along with any additional elements suitable to support communication between wireless communication devices 110 or between a wireless communication device 110 and another communication device (such as a landline telephone). Although the illustrated wireless communication devices 110 may represent communication devices that include any suitable combination of hardware and/or software, the wireless communication devices 110 may, in particular embodiments, represent devices such as the example wireless communication device 200 illustrated in greater detail by FIG. 2. Similarly, although the illustrated radio access node 120 may represent network nodes that include any suitable combination of hardware and/or software, these nodes may, in particular embodiments, represent devices such as the example radio access node 300 illustrated in greater detail by FIG. 3.

As shown in FIG. 2, the example wireless communication device 200 includes a processor (or processing circuitry) 210, a memory 220, a transceiver 230, and antennas 240. In particular embodiments, some or all of the functionality described above as being provided by machine type communication ("MTC") and machine-to-machine ("M2M") devices, and/or any other types of wireless communication devices may be provided by the device processor executing instructions stored on a computer-readable medium, such as the memory shown in FIG. 2. Alternative embodiments of the wireless communication device 200 may include additional components beyond those shown in FIG. 2 that may be responsible for providing certain aspects of the device's functionality, including any of the functionality described above and/or any functionality necessary to support the solution described herein.

As shown in FIG. 3, the example radio access node 300 includes a processor (or processing circuitry) 310, a memory 320, a transceiver 330, a network interface 340 and antennas 350. In particular embodiments, some or all of the functionality described herein may be provided by a base station, a node B, an enhanced node B, a base station controller, a radio network controller, a relay station and/or any other type of network node may be provided by the node processor executing instructions stored on a computer-readable medium, such as the memory shown in FIG. 3. Alternative embodiments of the radio access node 300 may include additional components responsible for providing additional functionality, including any of the functionality identified above and/or any functionality necessary to support the solution described herein.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof.

The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

Figure 4:
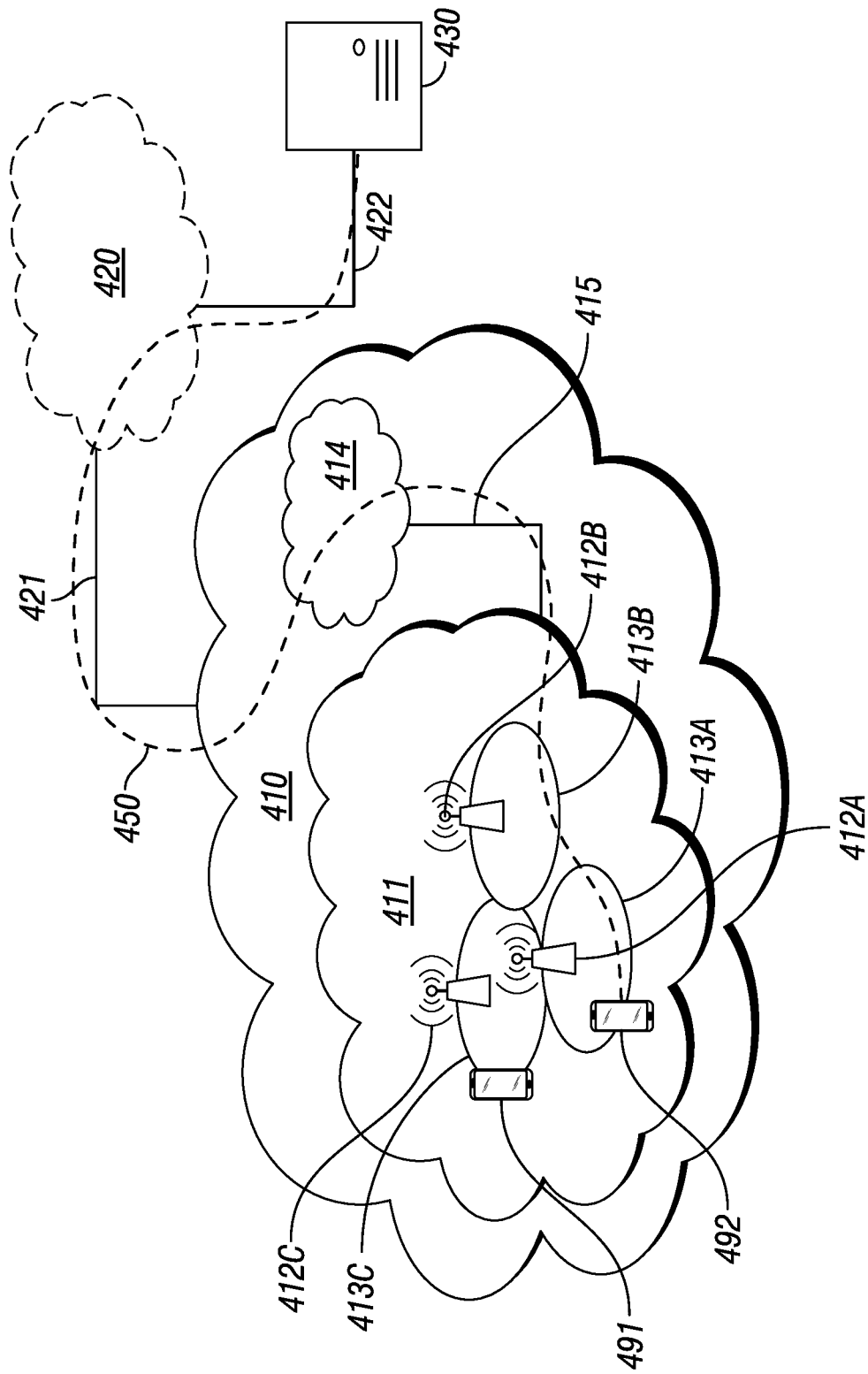
FIG. 4 illustrates a schematic view of an embodiment of a communication system including a communication network.

Turning now to FIG. 4, illustrated is a schematic view of an embodiment of a communication system including a communication network (e.g., a 3GPP-type cellular network) 410 connected to a host computer. The communication network 410 includes an access network 411, such as a radio access network, and a core network 414. The access network 411 includes a plurality of base stations 412a, 412b, 412c, such as NBs, eNBs, gNBs or other types of wireless access points, each defining a corresponding coverage area 413a, 413b, 413c. Each base station 412a, 412b, 412c is connectable to the core network 414 over a wired or wireless connection 415. A first user equipment ("UE") 491 located in coverage area 413c is configured to wirelessly connect to, or be paged by, the corresponding base station 412c. A second user equipment 492 in coverage area 413a is wirelessly connectable to the corresponding base station 412a. While a plurality of user equipment 491, 492 are illustrated in this example, the disclosed embodiments are equally applicable to a situation where a sole user equipment is in the coverage area or where a sole user equipment is connecting to the corresponding base station 412.

The communication network 410 is itself connected to the host computer 430, which may be embodied in the hardware and/or software of a standalone server, a cloud-implemented server, a distributed server or as processing resources in a server farm. The host computer 430 may be under the ownership or control of a service provider, or may be operated by the service provider or on behalf of the service provider. The connections 421, 422 between the communication network 410 and the host computer 430 may extend directly from the core network 414 to the host computer 430 or may go via an optional intermediate network 420. The intermediate network 420 may be one of, or a combination of more than one of, a public, private or hosted network; the intermediate network 420, if any, may be a backbone network or the Internet; in particular, the intermediate network 420 may include two or more sub-networks (not shown).

The communication system of FIG. 4 as a whole enables connectivity between one of the connected user equipment 491, 492 and the host computer 430. The connectivity may be described as an over-the-top ("OTT") connection 450. The host computer 430 and the connected user equipment 491, 492 are configured to communicate data and/or signaling via the OTT connection 450, using the access network 411, the core network 414, any intermediate network 420 and possible further infrastructure (not shown) as intermediaries. The OTT connection 450 may be transparent in the sense that the participating communication devices through which the OTT connection 450 passes are unaware of routing of uplink and downlink communications. For example, a base station 412 may not or need not be informed about the past routing of an incoming downlink communication with data originating from a host computer 430 to be forwarded (e.g., handed over) to a connected user equipment 491. Similarly, the base station 412 need not be aware of the future routing of an outgoing uplink communication originating from the user equipment 491 towards the host computer 430.

Figure 5:
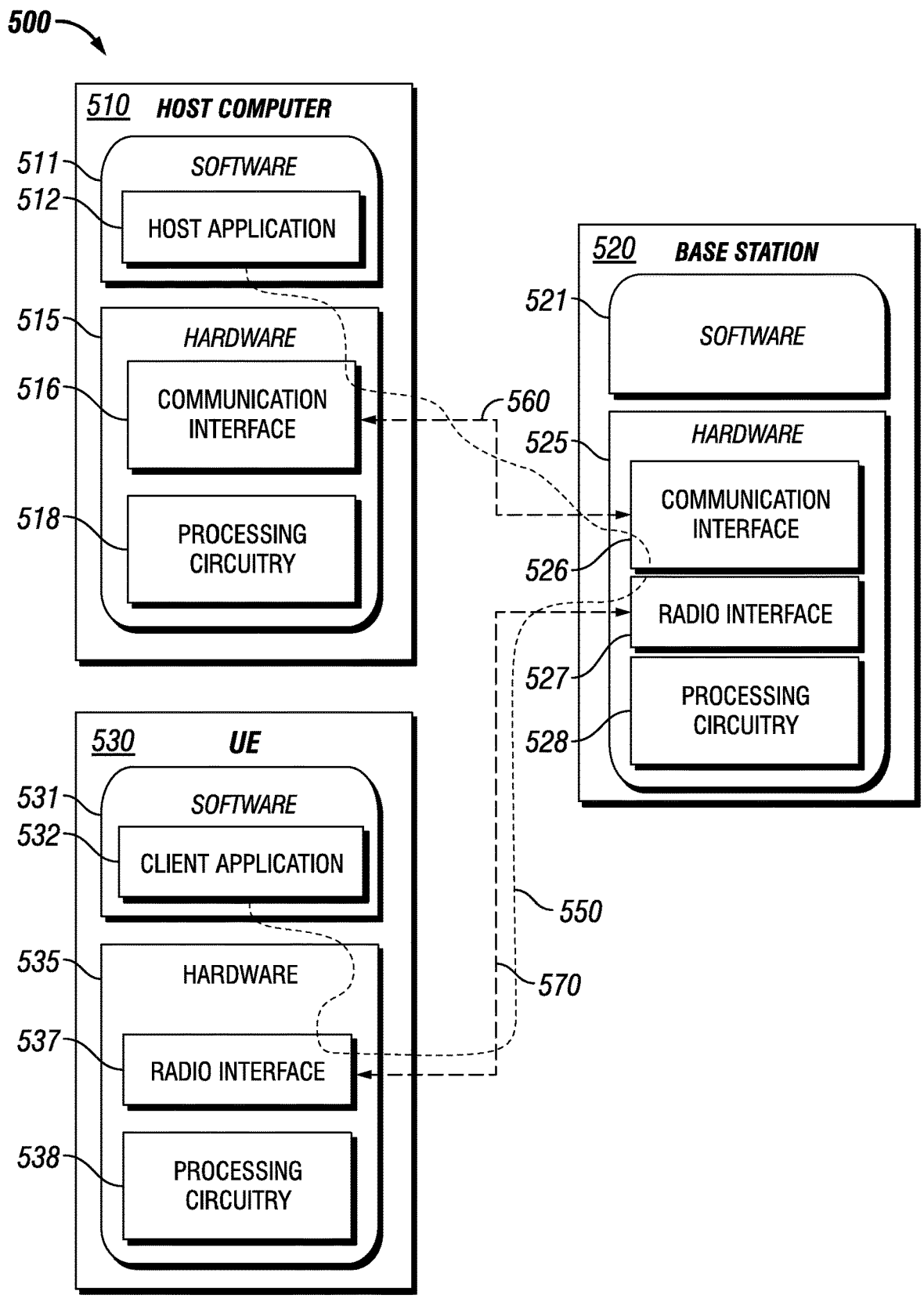
FIG. 5 illustrates a block diagram of an embodiment of a communication system.

Turning now to FIG. 5, illustrated is a block diagram of an embodiment of a communication system 500. In the communication system 500, a host computer 510 includes hardware 515 including a communication interface 516 configured to set up and maintain a wired or wireless connection with an interface of a different communication device of the communication system 500. The host computer 510 further includes processing circuitry (a processor) 518, which may have storage and/or processing capabilities. In particular, the processing circuitry 518 may include one or more programmable processors, application-specific integrated circuits, field programmable gate arrays or combinations of these (not shown) adapted to execute instructions. The host computer 510 further includes software 511, which is stored in or accessible by the host computer 510 and executable by the processing circuitry 518. The software 511 includes a host application 512. The host application 512 may be operable to provide a service to a remote user, such as a user equipment ("UE") 530 connecting via an OTT connection 550 terminating at the user equipment 530 and the host computer 510. In providing the service to the remote user, the host application 512 may provide user data which is transmitted using the OTT connection 550.

The communication system 500 further includes a base station 520 provided in a communication system and including hardware 525 enabling it to communicate with the host computer 510 and with the user equipment 530. The hardware 525 may include a communication interface 526 for setting up and maintaining a wired or wireless connection with an interface of a different communication device of the communication system 500, as well as a radio interface 527 for setting up and maintaining at least a wireless connection 570 with a user equipment 530 located in a coverage area (not shown in FIG. 5) served by the base station 520. The communication interface 526 may be configured to facilitate a connection 560 to the host computer 510. The connection 560 may be direct or it may pass through a core network (not shown in FIG. 5) of the communication system and/or through one or more intermediate networks outside the communication system. In the embodiment shown, the hardware 525 of the base station 520 further includes processing circuitry (a processor) 528, which may include one or more programmable processors, application-specific integrated circuits, field programmable gate arrays or combinations of these (not shown) adapted to execute instructions. The base station 520 further has software 521 stored internally or accessible via an external connection.

The communication system 500 further includes the user equipment 530. The user equipment 530 includes hardware 535 having a radio interface 537 configured to set up and maintain a wireless connection 570 with a base station 520 serving a coverage area in which the user equipment 530 is currently located. The hardware 535 of the user equipment 530 further includes processing circuitry (a processor) 538, which may comprise one or more programmable processors, application-specific integrated circuits, field programmable gate arrays or combinations of these (not shown) adapted to execute instructions. The user equipment 530 further includes software 531, which is stored in or accessible by the user equipment 530 and executable by the processing circuitry 538. The software 531 includes a client application 532. The client application 532 may be operable to provide a service to a human or non-human user via the user equipment 530, with the support of the host computer 510. In the host computer 510, an executing host application 512 may communicate with the executing client application 532 via the OTT connection 550 terminating at the user equipment 530 and the host computer 510. In providing the service to the user, the client application 532 may receive request data from the host application 512 and provide user data in response to the request data. The OTT connection 550 may transfer both the request data and the user data. The client application 532 may interact with the user to generate the user data that it provides.

It is noted that the host computer 510, base station 520 and user equipment 530 illustrated in FIG. 5 may be identical to the host computer 430, one of the base stations 412a, 412b, 412c and one of the user equipment 491, 492 of FIG. 4, respectively. This is to say, the inner workings of these entities may be as shown in FIG. 5 and independently, the surrounding network topology may be that of FIG. 4.

In FIG. 5, the OTT connection 550 has been drawn abstractly to illustrate the communication between the host computer 510 and the use equipment 530 via the base station 520, without explicit reference to any intermediary devices and the precise routing of messages via these devices. Network infrastructure may determine the routing, which it may be configured to hide from the user equipment 530 or from the service provider operating the host computer 510, or both. While the OTT connection 550 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring the OTT connection 550 between the host computer 510 and user equipment 530, in response to variations in the measurement results. The measurement procedure and/or the network functionality for reconfiguring the OTT connection 550 may be implemented in the software 511 of the host computer 510 or in the software 531 of the user equipment 530, or both. In embodiments, sensors (not shown) may be deployed in or in association with communication devices through which the OTT connection 550 passes; the sensors may participate in the measurement procedure by supplying values of the monitored quantities exemplified above, or supplying values of other physical quantities from which software 511, 531 may compute or estimate the monitored quantities. The reconfiguring of the OTT connection 550 may include message format, retransmission settings, preferred routing etc.; the reconfiguring need not affect the base station 520, and it may be unknown or imperceptible to the base station 520. Such procedures and functionalities may be known and practiced in the art. In certain embodiments, measurements may involve proprietary user equipment signaling facilitating the host computer's 510 measurements of throughput, propagation times, latency and the like. The measurements may be implemented in that the software 511, 531 causes messages to be transmitted, in particular empty or 'dummy' messages, using the OTT connection 550 while it monitors propagation times, errors, etc. Additionally, the communication system 500 may employ the principles as described herein.

A solution for estimating round-trip delay between a user equipment and a communication node such as the transmission and reception point is described in U.S. Patent Application Publication No. 2017/0006638, entitled "TRANSMISSION AND RECEPTION OF A RANDOM ACCESS PREAMBLE SIGNAL," and U.S. Patent Application Publication No. 2017/0006637, entitled "ENHANCED PRACH PREAMBLE FORMAT," which are incorporated herein by reference. In these applications instead of using a special long OFDM symbol, a normal OFDM symbol repeated multiple times is used, without a cyclic prefix between the repetitions, as illustrated in accordance with an embodiment in the lower panel New Radio ("NR") shown in FIG. 6, to which reference is now made.

Figure 6:
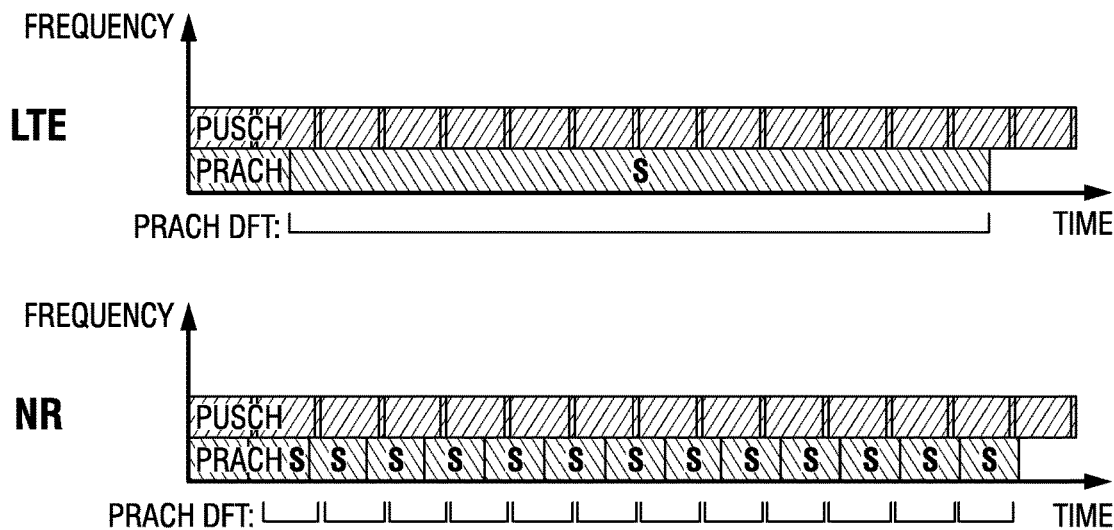
FIG. 6 illustrates graphical representations of embodiments of signaling formats of preambles for a physical random access channel ("PRACH")

Turning now FIG. 6, illustrated is graphical representations of embodiments of signaling formats of preambles for a PRACH. More specifically, FIG. 6 illustrates the LTE PRACH discrete Fourier transform ("DFT") format versus time in the upper portion of FIG. 6, and the NR PRACH discrete Fourier transform format introduced herein for NR in the lower portion. With the new format, each OFDM symbol effectively serves as a long cyclic prefix to the next OFDM symbol. The new format can also be applied to PRACH preambles wherein each OFDM symbol has a cyclic prefix.

A potential issue with the use of a PRACH preamble formed with several short sequences instead of a single long one, however, is that it is more difficult to find a large enough set of different sequences with both good auto- and cross-correlation properties. Good auto-correlation properties are advantageous for accurate delay estimation. Many sequences with good cross-correlation properties are preferable in a cellular system to simultaneously (i) ensure that user equipment in different nearby cells use different sequences so that a PRACH from a user equipment in a different cell is not mistakenly detected by a transmission and reception point, and (ii) ensure that there are many sequences allocated to each cell so that the risk of two user equipment using the same sequence to contact the network at the same time is reduced, particularly if each user equipment randomly selects a sequence from an allocated set, as is customary in radio communication systems such as LTE. For example, typical well-known sequence types such as Zadoff-Chu ("ZC") and Gold sequences of length N are limited to approximately N different sequences with good correlation properties. Other types such as m-sequences are limited to only one or a few sequences with good correlation properties. Henceforth, auto- and cross-correlation properties are sometimes collectively referred to as just correlation properties. See, for example, a book by P. Fan and M. Darnell, entitled "SEQUENCE DESIGN FOR COMMUNI- CATIONS APPLICATIONS", 1996, which is incorporated herein by reference, for descriptions related to Zadoff-Chu sequences, Gold sequences, and m-sequences, a.k.a. maximum-length sequences.

Various techniques can be used to go beyond this limit in some specific cases. For instance, if the maximum propagation delay in an environment is known to be below a delay parameter $T_{delay}$, then for each original sequence (with good correlation properties), a set of sequences can be generated that are identical except for cyclic shifts of 0, $T_{delay}$, $2T_{delay}$, $3T_{delay}$, ... that can be proved to also have good correlation properties (with all shifted and original sequences). If the original sequence is short, however, no or very few different shifts may be possible in typical environments.

A solution to this potential issue was proposed in the document R1-1700034 entitled "RACH PREAMBLE DESIGN FOR NR", Huawei, HiSilicon, 3GPP TSG-RAN WG1 RAN1-NR #1, Spokane, USA, Jan. 16-20, 2017, which is incorporated herein by reference. This document describes a method for generating many different sequences with good auto- and cross-correlation properties. This is achieved by multiplying (non-shifted) Zadoff-Chu sequences elementwise with different cyclic-shifted versions of an m-sequence. For example, if N is a prime number, then it is possible to generate N-1 different Zadoff-Chu sequences with good correlation properties, each of which can be combined with an m-sequence (also of length N) with any cyclic shift in the range 0 . . . N-1, hence forming (N-1)·N different sequences with good auto- and cross-correlation properties. Other such sequence combinations may also be possible. The general idea of combining a chirp-like sequence (of which Zadoff-Chu is a typical example) and a binary sequence with good correlation properties (of which an m-sequence is a typical example) as a means to design sequences with good correlation properties has been proposed before, as described by Hamad-Ameen in the document entitled "PROPOSED SETS OF POLYPHASE SPREADING SEQUENCES FOR DS-CDMA SYSTEM," published in the proceedings of the 5th WSEAS International Conf. on Telecommunications and Informatics, Istanbul, Turkey, May 27-29, 2006, pp. 371-376, which is incorporated herein by reference.

A similar effect can be achieved by multiplying Zadoff-Chu sequences with different cyclic shifts with non-shifted m-sequences. A mix of Zadoff-Chu shifts and m-sequence shifts can also be used, as long as there are no undesirable ambiguities arising in the relevant use cases. It is noted that methods introduced herein are applicable to all these types of shifts. It is also noted that the relative shifts between the Zadoff-Chu and m sequences discussed herein are not to be confused with the overall common shift by multiples of $T_{delay}$ as discussed hereinbelow.

The elementwise combination of two sequences entails that the two sequences have equal length. However, this is not necessarily fulfilled for certain sequence combinations that otherwise would be attractive (see, e.g., efficient implementations for the ZCxM design principle described in document R1-1700034 entitled "RACH PREAMBLE DESIGN FOR NR", Huawei, HiSilicon, 3GPP TSG-RAN WG1 RAN1-NR #1, Spokane, USA, Jan. 16-20, 2017, which is incorporated herein by reference). In order to generate many different Zadoff-Chu sequences of a given length N, N is a prime number, whereas the length of an m-sequence is in the form $2^n-1$, where n is an integer. Having to fulfill these two requirements at the same time limits the possible choices of sequence lengths.

This limitation turns out to be highly relevant in practice, since in a recent proposal for PRACH preamble design for NR described in the Ericsson document R1-1700298, "NR PRACH DESIGN," which is incorporated herein by reference, the number of subcarriers should be 72 (for all carrier frequencies, though the subcarrier spacing may vary), implying that the synchronization sequence for good detection performance should have a length of N=72 or just slightly shorter, e.g., because otherwise delay estimation accuracy is substantially reduced. However, the largest number N≤72 that is both a prime number and a number on the form $2^n-1$ is 31. Note that in document R1-1700034 cited hereinabove, the method is exemplified with a sequence of length 63, which enables only two Zadoff-Chu sequences with good correlation properties to be generated.

As introduced herein, methods are described for combining two sequences of unequal length in a way that yields the same or similar correlation properties as would have been expected from a simple elementwise multiplication of equal-length sequences. In an embodiment, this is achieved by generating the two sequences in the time domain ("TD"). Then, for each sequence separately: (i) convert it to frequency domain ("FD") using a discrete Fourier transform, (ii) pad it with zeros to the desired number of subcarriers if, for instance, the frequency-domain representation is shorter than the desired number of subcarriers (the same for both sequences), and (iii) convert it back to the time domain using an inverse discrete Fourier transform ("IDFT"). Finally, multiply the two now-equal-length time domain sequences elementwise. This results in a sequence in the time domain with (close to) the desired correlation properties.

Although embodiments described herein illustrate using the context of sequence design for a PRACH, the concepts described herein can be equally applicable to other applications where many sequences with good correlation properties are needed. Embodiments described herein enable construction of a large number of sequences with good auto- and cross-correlation properties, which in turn could, e.g., improve PRACH preamble or other signal detection performance and thereby make user equipment connection and/or handover procedures faster and more reliable in networks such as 5G networks.

Figure 7:
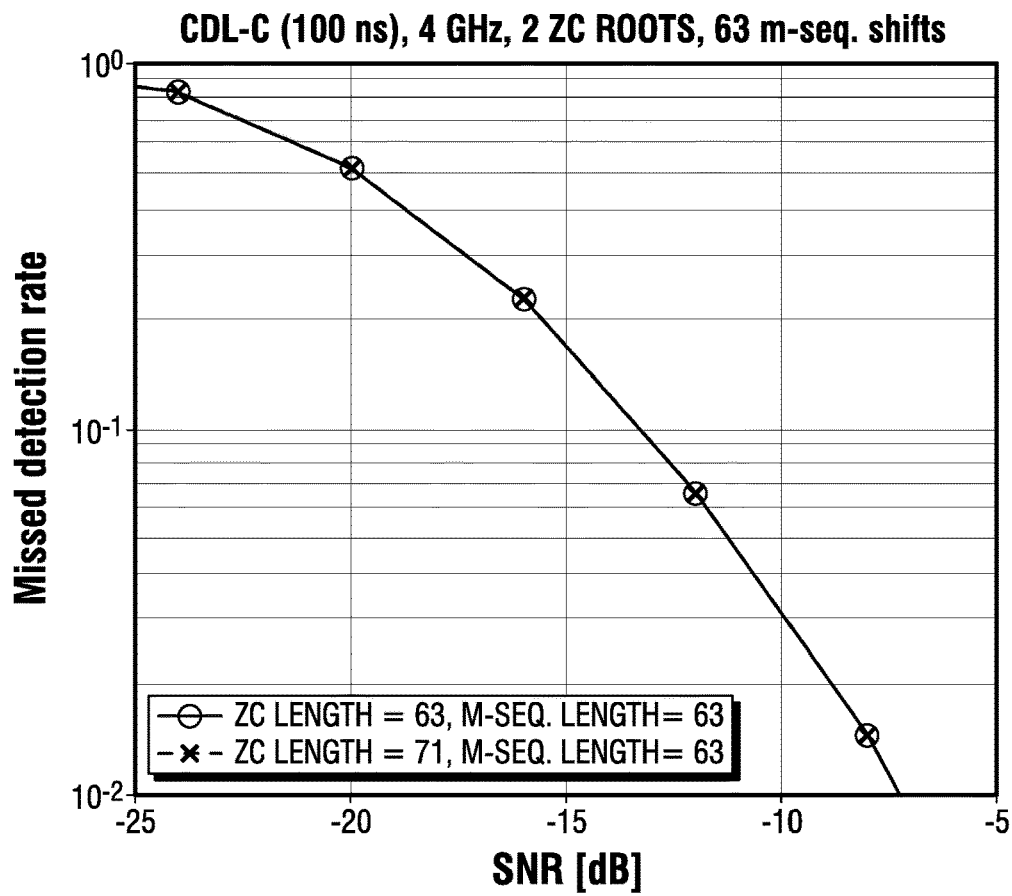
FIG. 7 illustrates a graphical representation of a link simulation illustrating a performance of a combined synchronization sequence.

Turning now to FIG. 7, illustrated is a graphical representation of a link simulation illustrating a performance of a combined synchronization sequence that yields acceptable single-link performance while allowing for a large number of sequences with good correlation properties. FIG. 7 shows that the process introduced herein for combining two sequences of unequal length (a length-71 Zadoff-Chu ("ZC") sequence and a length-63 m-sequence) provides analogous performance as combining two sequences of the same length (a length-63 Zadoff-Chu and a length-63 m-sequence). At the same time, use of the new length-71 Zadoff-Chu ("ZC") sequence allows for construction of 4410 (70·63) sequences, while use of length-63 Zadoff-Chu ("ZC") only allows for construction of 126 (2·63) sequences with good cross-correlation properties. Methods introduced herein combine two sequences of unequal length in a way that yields the same or similar correlation properties as would have been expected from a simple elementwise multiplication of equal-length sequences.

In an embodiment, the length of each sequence is separately extended to a common length in such a way that correlation properties of each individual sequence are maintained. This may be achieved by converting each time domain ("TD") sequence separately to a frequency domain-like ("FD"-like) representation (e.g., using a discrete Fourier transform ("DFT")). Of course, other types of transforms are also possible such as, without limitation, a Walsh transform and a discrete cosine transform ("DCT"). The process then pads each sequence separately, in the frequency domain-like representation, to the desired length, e.g., 72 subcarriers, before converting back to the time domain representation. After the sequences have the same length, they can be multiplied elementwise.

In more detail, the process includes generating the two sequences in the time domain ("TD"). Then, for each sequence separately: (i) convert it to frequency domain ("FD") using a discrete Fourier transform; (ii) pad it with zeros to the desired number of subcarriers if, for instance, the frequency-domain representation is shorter than the desired number of subcarriers (the same for both sequences); (iii) convert it back to time domain using an inverse discrete Fourier transform. Then, multiply the two (now equal-length) time domain sequences elementwise. Then, modulate by DFTS-OFDM, i.e., transform to frequency domain by the same amount of sub-carriers as the time domain sequences followed by zero padding, performing an inverse discrete Fourier transform, and concatenating with a cyclic prefix. It is noted that hardware accelerators for at least the inverse discrete Fourier transform of the relevant length are available in communication nodes and hence the use of DFT/IDFTs can be convenient from an implementation perspective.

The two sequences may be, without limitation, chirp-like sequences (e.g., a Zadoff-Chu sequence, a generalized Zadoff-Chu sequence, a Frank sequence, a generalized Frank sequence, a Milewski sequence, an Ipatov sequence, a generalized chirp-like ("GCL") sequence as described by Popovic in the paper entitled "GENERALIZED CHIRP LIKE POLYPHASE SEQUENCES WITH OPTIMUM CORRELATION PROPERTIES," published in IEEE Transactions on Information Theory, vol. 38, no. 4, pp. 1406-1409, July 1992, which is incorporated herein by reference, a Mow sequence as described by Mow, in the paper entitled "A UNIFIED CONSTRUCTION OF PERFECT POLYPHASE SEQUENCES," published in the Proceedings of 1995 IEEE International Symposium on Information Theory, Whistler, BC, 1995, pp. 459, which is incorporated herein by reference), and a binary sequence (e.g., an m-sequence, a Barker sequence, a Golay sequences, etc.) However, combinations of two other types of sequences, or two sequences of similar type is also possible.

The method can also be used to combine three or more sequences. Each sequence (or ones thereof) can then be extended to a common length before multiplying them elementwise. Another option is to first extend just a subset of the sequences to a common length before combining them (by elementwise multiplication in the time domain) to form a new sequence, and then extend that sequence and other sequences to a common length before final combining in the time domain. If one of the sequences is subjected to different cyclic shifts, the cyclic shifts can be performed before or after the extension to a common length.

The methods described here may also be useful for other types of combining than a pure elementwise multiplication in the time domain. For example, a weighted addition (linear combination using real or complex number weights) is possible. For example, two real-valued binary sequences may be combined to one complex sequence, which is then elementwise multiplied with the first sequence (e.g., a Zadoff-Chu sequence).

In a communication node (or device in general) where the individual (non-combined) sequences are stored in memory, it may be advantageous to store them in an already padded state in the frequency domain, or in interpolated time domain. Then only the elementwise multiplication needs to be carried out in real-time. Alternatively, if the sequences involved can be generated directly in the frequency domain (this applies, e.g., to Zadoff-Chu sequences), it may be advantageous to directly generate the sequences in the frequency domain, omitting the initial conversion from the time domain to the frequency domain of each sequence.

In a possible implementation, the (two or more) sequences of different lengths are generated in the time domain, individually transformed to the frequency domain and padded with zeros, transformed to the time domain where the cyclic prefix is added before or after the elementwise multiplications. Here the padding with zeros might be done up to the system bandwidth, i.e., the number of sub-carriers in the frequency domain corresponds to a sampling rate as used in the radio.

In some scenarios, one of the individual sequences may already have the length equal to the desired combined sequence length. In such cases, the conversion to the frequency domain and zero-padding needs to be applied to the remaining, shorter time domain sequence.

In some embodiments, the final element-wise multiplication may be performed as a circular convolution in the frequency domain. While this is strictly speaking less computationally efficient than multiplication in the time domain, it may be preferable in cases where additional signals in the carrier bandwidth are too aggregated in the frequency domain and transformed to the time domain together. The computational impact may be considered negligible for shorter sequences like the short PRACH preamble example.

If in some application sequences with good correlation properties in the frequency domain rather than the time domain are desired, the general method described above can be used, except that the extension to same length is performed by converting to the time domain using an inverse discrete Fourier transform, padding in the time domain to desired length, and then converting back to the frequency domain using a discrete Fourier transform (or if another transform is used in the time domain-like domain).

The following steps can be performed in a typical application. The first step is to create a first sequence of type A (e.g., a Zadoff-Chu) and then a second sequence of type B (e.g., m-sequence) having a different length than the first sequence. The next step is to extend each sequence separately to a common length by, without limitation, the steps of a discrete Fourier transform, 0-padding and an inverse discrete Fourier transform. Thereafter, the equal-length sequences are multiplied elementwise in the time domain and a user equipment transmits the sequence for detection by a transmission and reception point or another user equipment. The type A and B sequences may be the same. The steps up to multiplying the sequences may be precomputed (possibly at the user equipment, and transmission and reception point configuration) to form sequences stored in memory thereof.

Thus, a method has been introduced that combines two sequences with good correlation properties, but of unequal length in a way that yields cross-correlation properties similar to those one would have expected if two equal-length sequences of the same types would have been combined. More specifically, two sequences of different lengths are extended (or one sequence is extended to match the other sequence) to a common length in a way that essentially preserves correlation properties before multiplying them elementwise in the time domain. The two sequences with good correlation properties are converted separately to frequency domain using a discrete Fourier transform, extended to a desired length, and then converted back to time domain using an inverse discrete Fourier transform, before multiplying the two sequences elementwise.

Figure 8:
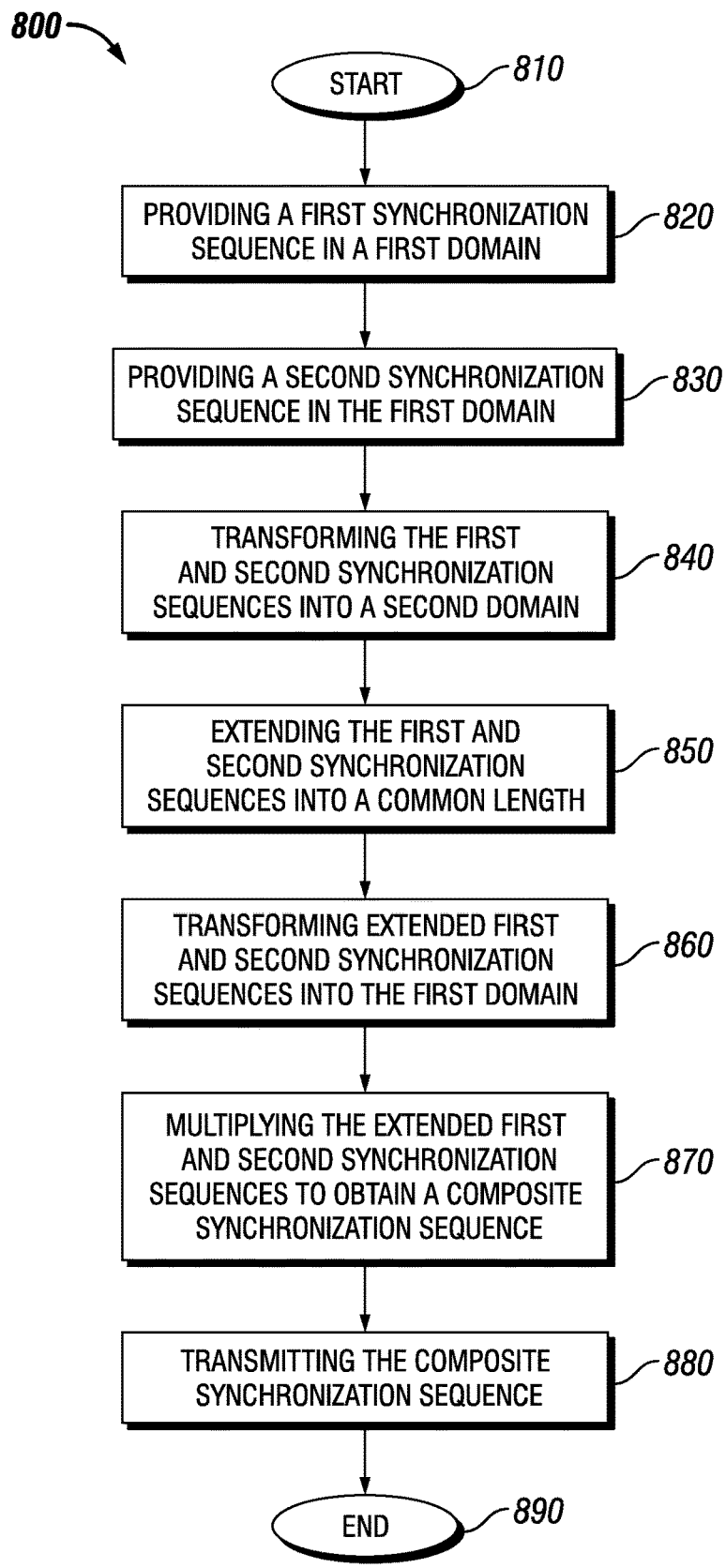
FIG. 8 illustrates a flow diagram of an embodiment of a method of operating a communication node of a communication system.

Turning now to FIG. 8, illustrated is a flow diagram of an embodiment of a method 800 of operating a communication node of a communication system. The method 800 begins at a start step or module 810. At a step or module 820, the method 800 includes providing a first synchronization sequence in a first domain (e.g., a time domain ("TD")). The method 800 continues by providing a second synchronization sequence in the first domain having a different length than the first synchronization sequence at a step or module 830. The first synchronization sequence may be a different type than the second synchronization sequence. For instance, the first synchronization sequence may be a Zadoff-Chu sequence and the second synchronization sequence a m-sequence.

The method 800 further includes transforming the first synchronization sequence and the second synchronization sequence into a second domain (e.g., a frequency domain ("FD")) via, for instance, applying a discrete Fourier transform thereto at a step or module 840. The method 800 continues by extending the first synchronization sequence and the second synchronization sequence in the second domain to a common length via, for instance, applying zero padding thereto at a step or module 850. At a step or module 860, the method 800 includes transforming an extended first synchronization sequence and an extended second synchronization sequence into the first domain via, for instance, applying an inverse discrete Fourier transform thereto.

The method 800 further includes multiplying elementwise the extended first synchronization sequence by the extended second synchronization sequence in the first domain to obtain a composite synchronization sequence at a step or module 870. The composite synchronization sequence may be employed as a physical random access channel preamble. At a step or module 880, the method 800 includes transmitting the composite synchronization sequence from the communication node (e.g., a user equipment) to another communication node (e.g., a radio access node or a user equipment). It should be noted that the previous steps or modules to obtain the composite synchronization sequence may be precomputed and stored in a memory of the communication node. Additionally, if the first and second synchronization sequences are provided in the second domain, then the method 800 may omit transforming the same to the second domain before extending the first and second synchronization sequences. The method ends at a step or module 890.

Thus, a system and method for generating a composite synchronization sequence in a communication system has been introduced herein. In one embodiment (and with continuing reference to the aforementioned FIGUREs), an apparatus (such as a user equipment 110, 200 with processing circuitry 210 or a radio access node 120, 300 with processing circuitry 310) is operable in a communication system (100) and configured to provide (820) a first synchronization sequence in a first domain (e.g., a time domain), and provide (830) a second synchronization sequence in the first domain having a different length than the first synchronization sequence. The first synchronization sequence (e.g., a Zadoff-Chu sequence) may be a different type than the second synchronization sequence (e.g., an m-sequence). The apparatus (110, 200, 120, 300) is also configured to transform (840, e.g., by applying a discrete Fourier transform) the first synchronization sequence and the second synchronization sequence into a second domain (e.g., a frequency domain), and extend (850, e.g., by applying zero padding) the first synchronization sequence in the second domain and the second synchronization sequence in the second domain to a common length to produce an extended first synchronization sequence and an extended second synchronization sequence.

The apparatus (110, 200, 120, 300) is also configured to transform (860, e.g., by applying an inverse discrete Fourier transform) the extended first synchronization sequence and the extended second synchronization sequence into the first domain, and multiply (870) elementwise the extended first synchronization sequence by the extended second synchronization sequence in the first domain to obtain a composite synchronization sequence. The apparatus (110, 200, 120, 300) is also configured to transmit (880) the composite synchronization sequence to another communication node (such as another user equipment 110, 200 or a radio access node 120, 300). The composite synchronization sequence may be precomputed and stored in a memory (220, 320) of the apparatus (110, 200, 120, 300) and employed as a physical random access channel preamble.

It should be understood that the process of extending both synchronization sequences may be reduced to extending only one of the synchronization sequences, especially if the other synchronization sequence is the proper length. In such case, the multiplication will be performed with a non-extended synchronization sequence and an extended synchronization sequence. Also, prior to the multiplication step mentioned above, the method may cyclically shift one of the synchronization sequences by a number of steps and, thereafter, perform the elementwise multiplication.

Figure 9:
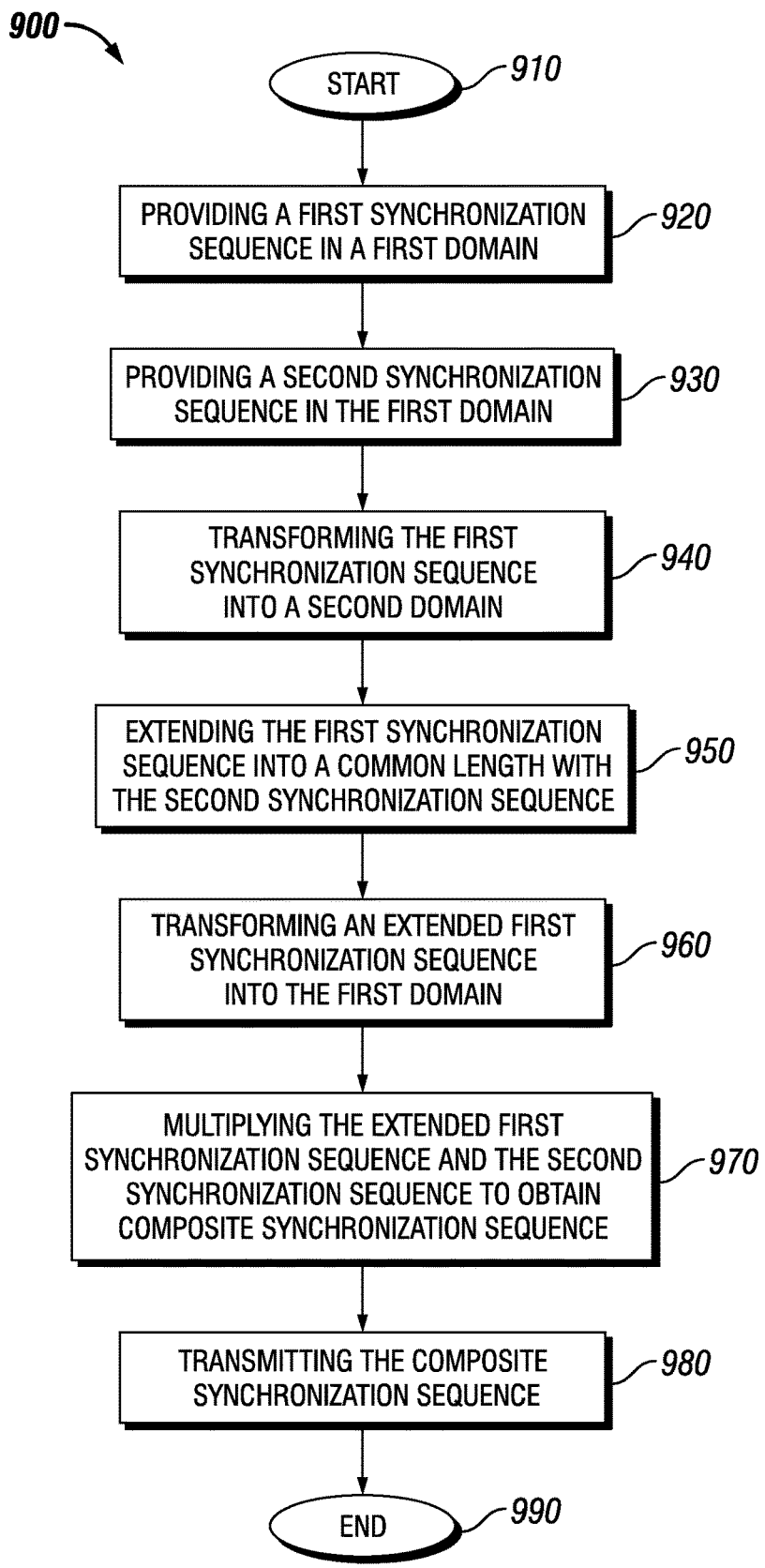
FIG. 9 illustrates a flow diagram of another embodiment of a method of operating a communication node of a communication system.

Turning now to FIG. 9, illustrated is a flow diagram of an embodiment of a method 900 of operating a communication node of a communication system. The method 900 begins at a start step or module 910. At a step or module 920, the method 900 includes providing a first synchronization sequence in a first domain (e.g., a time domain ("TD")). The method 900 continues by providing a second synchronization sequence in the first domain having a different length than the first synchronization sequence at a step or module 930. The first synchronization sequence may be a different type than the second synchronization sequence. For instance, the first synchronization sequence may be a Zadoff-Chu sequence and the second synchronization sequence a m-sequence.

The method 900 further includes transforming the first synchronization sequence into a second domain (e.g., a frequency domain ("FD")) via, for instance, applying a discrete Fourier transform thereto at a step or module 940. The method 900 continues by extending the first synchronization sequence in the second domain to a common length with the second synchronization sequence in the first domain via, for instance, applying zero padding thereto at a step or module 950. At a step or module 960, the method 900 includes transforming an extended first synchronization sequence into the first domain via, for instance, applying an inverse discrete Fourier transform thereto.

The method 900 further includes multiplying elementwise the extended first synchronization sequence in the first domain by the second synchronization sequence in the first domain to obtain a composite synchronization sequence at a step or module 970. The composite synchronization sequence may be employed as a physical random access channel preamble. At a step or module 980, the method 900 includes transmitting the composite synchronization sequence from the communication node (e.g., a user equipment) to another communication node (e.g., a radio access node or a user equipment). It should be noted that the previous steps or modules to obtain the composite synchronization sequence may be precomputed and stored in a memory of the communication node. Additionally, if the first synchronization sequence is provided in the second domain, then the method 900 may omit transforming the same to the second domain before extending the first synchronization sequence. The method ends at a step or module 990.

Thus, a system and method for generating a composite synchronization sequence in a communication system has been introduced herein. In one embodiment (and with continuing reference to the aforementioned FIGUREs), an apparatus (such as a user equipment 110, 200 with processing circuitry 210 or a radio access node 120, 300 with processing circuitry 310) is operable in a communication system (100) and configured to provide (920) a first synchronization sequence in a first domain (e.g., a time domain), and provide (930) a second synchronization sequence in the first domain having a different length than the first synchronization sequence. The first synchronization sequence (e.g., a Zadoff-Chu sequence) may be a different type than the second synchronization sequence (e.g., an m-sequence). The apparatus (110, 200, 120, 300) is also configured to transform (940, e.g., by applying a discrete Fourier transform) the first synchronization sequence into a second domain (e.g., a frequency domain), and extend (950, e.g., by applying zero padding) the first synchronization sequence in the second domain to a common length with the second synchronization sequence in the first domain to produce an extended first synchronization sequence.

The apparatus (110, 200, 120, 300) is also configured to transform (960, e.g., by applying an inverse discrete Fourier transform) the extended first synchronization sequence into the first domain, and multiply (970) elementwise the extended first synchronization sequence in the first domain by the second synchronization sequence in the first domain to obtain a composite synchronization sequence. The apparatus (110, 200, 120, 300) is also configured to transmit (980) the composite synchronization sequence to another communication node (such as another user equipment 110, 200 or a radio access node 120, 300). The composite synchronization sequence may be precomputed and stored in a memory (220, 320) of the apparatus (110, 200, 120, 300) and employed as a physical random access channel preamble.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. An apparatus operable in a communication system comprising:
    processing circuitry configured to:
        provide a first synchronization sequence in a first domain;
        provide a second synchronization sequence in said first domain having a different length than said first synchronization sequence;
        transform said first synchronization sequence and said second synchronization sequence into a second domain;
        extend said first synchronization sequence in said second domain and said second synchronization sequence in said second domain to a common length to produce an extended first synchronization sequence and an extended second synchronization sequence;
        transform said extended first synchronization sequence and said extended second synchronization sequence into said first domain; and
        multiply elementwise said extended first synchronization sequence in said first domain by said extended second synchronization sequence in said first domain to obtain a composite synchronization sequence.

2. The apparatus as recited in claim 1, wherein said processing circuitry is configured to transmit said composite synchronization sequence to a communication node.

3. The apparatus as recited in claim 1, wherein said first synchronization sequence is a different type than said second synchronization sequence.

4. The apparatus as recited in claim 1, wherein said first synchronization sequence is a Zadoff-Chu sequence and said second synchronization sequence is a m-sequence.

5. The apparatus as recited in claim 1, wherein said first domain is a time domain and said second domain is a frequency domain.

6. The apparatus as recited in claim 1, wherein said processing circuitry is configured to transform said first synchronization sequence and said second synchronization sequence into said second domain in accordance with applying a discrete Fourier transform to said first synchronization sequence and said second synchronization sequence.

7. The apparatus as recited in claim 1, wherein said processing circuitry is configured to extend said first synchronization sequence and said second synchronization sequence in said second domain in accordance with applying zero padding to said first synchronization sequence and said second synchronization sequence.

8. The apparatus as recited in claim 1, wherein said processing circuitry is configured to transform said extended first synchronization sequence and said extended second synchronization sequence into said first domain in accordance with applying an inverse discrete Fourier transform to said extended first synchronization sequence and said extended second synchronization sequence.

9. The apparatus as recited in claim 1, wherein said composite synchronization sequence is employed as a physical random access channel preamble.

10. The apparatus as recited in claim 1, wherein said processing circuitry is configured to precompute and store said composite synchronization sequence in a memory of said apparatus.

11. A method of operating a communication node in a communication system, comprising:
    providing a first synchronization sequence in a first domain;
    providing a second synchronization sequence in said first domain having a different length than said first synchronization sequence;
    transforming said first synchronization sequence and said second synchronization sequence into a second domain;
    extending said first synchronization sequence in said second domain and said second synchronization sequence in said second domain to a common length to produce an extended first synchronization sequence and an extended second synchronization sequence;
    transforming said extended first synchronization sequence and said extended second synchronization sequence into said first domain; and
    multiplying elementwise said extended first synchronization sequence in said first domain by said extended second synchronization sequence in said first domain to obtain a composite synchronization sequence.

12. The method as recited in claim 11, further comprising transmitting said composite synchronization sequence to another communication node.

13. The method as recited in claim 11, wherein said first synchronization sequence is a different type than said second synchronization sequence.

14. The method as recited in claim 11, wherein said first synchronization sequence is a Zadoff-Chu sequence and said second synchronization sequence is a m-sequence.

15. The method as recited in claim 11, wherein said first domain is a time domain and said second domain is a frequency domain.

16. The method as recited in claim 11, wherein said transforming said first synchronization sequence and said second synchronization sequence into said second domain comprises applying a discrete Fourier transform to said first synchronization sequence and said second synchronization sequence.

17. The method as recited in claim 11, wherein said extending said first synchronization sequence and said second synchronization sequence in said second domain comprises applying zero padding to said first synchronization sequence and said second synchronization sequence.

18. The method as recited in claim 11, wherein said transforming said extended first synchronization sequence and said extended second synchronization sequence into said first domain comprises applying an inverse discrete Fourier transform to said extended first synchronization sequence and said extended second synchronization sequence.

19. The method as recited in claim 11, wherein said composite synchronization sequence is employed as a physical random access channel preamble.

20. The method as recited in claim 11, wherein said providing said first synchronization sequence in said first domain, providing said second synchronization sequence in said first domain, transforming said first synchronization sequence and said second synchronization sequence into said second domain, extending said first synchronization sequence and said second synchronization sequence in said second domain, transforming said extended first synchronization sequence and said extended second synchronization sequence into said first domain, and multiplying elementwise said extended first synchronization sequence in said first domain by said extended second synchronization sequence in said first domain to obtain said composite synchronization sequence is precomputed and stored in a memory of said communication node.

* * * * *